(12) United States Patent
Young

(10) Patent No.: US 9,731,643 B1
(45) Date of Patent: Aug. 15, 2017

(54) MECHANISM THAT HOLDS A HAULED OBJECT IN A PARTICULAR POSITION IN A PICKUP TRUCK BED

(71) Applicant: Michael C. Young, Portage, WI (US)

(72) Inventor: Michael C. Young, Portage, WI (US)

( * ) Notice: Subject to any disclaimer, the term of this patent is extended or adjusted under 35 U.S.C. 154(b) by 23 days.

(21) Appl. No.: 15/294,749

(22) Filed: Oct. 16, 2016

Related U.S. Application Data

(60) Provisional application No. 62/329,616, filed on Apr. 29, 2016.

(51) Int. Cl.
  *B60P 7/15* (2006.01)
  *B60P 7/08* (2006.01)

(52) U.S. Cl.
  CPC .............. *B60P 7/15* (2013.01); *B60P 7/0823* (2013.01)

(58) Field of Classification Search
  CPC ..... B60P 7/0823; B60P 7/0876; B60P 7/0807; B60P 7/135; B60P 3/40; B60P 7/06; B60P 7/0815

USPC ....... 410/97, 98, 118, 106, 100, 104, 22, 44, 410/46, 7, 8, 94, 99; 296/193.04, 100.16
See application file for complete search history.

(56) References Cited

U.S. PATENT DOCUMENTS

| | | | | |
|---|---|---|---|---|
| 4,168,667 A | * | 9/1979 | Loomis | B60P 7/14 410/118 |
| 4,770,579 A | * | 9/1988 | Aksamit | B60P 7/15 410/120 |
| 6,058,749 A | * | 5/2000 | Rekemeyer | B60R 25/0221 70/14 |
| 8,434,978 B2 | * | 5/2013 | Tardif | B60P 7/0807 410/100 |
| 8,870,503 B2 | * | 10/2014 | Stromberg | B60P 7/06 410/97 |
| 2014/0369782 A1 | * | 12/2014 | Reid | B60P 7/15 410/143 |

* cited by examiner

*Primary Examiner* — Glenn Dayoan
*Assistant Examiner* — Sunsurraye Westbrook
(74) *Attorney, Agent, or Firm* — James Earl Lowe, Jr.

(57) ABSTRACT

A bar assembly adapted to be removable attached to the top of the sides of a bed of a pickup truck, the bar assembly including a bar, and J hooks adapted to engage each end of the bar for removably attaching each end of the bar to a respective top of the side of the bed of the pickup truck.

4 Claims, 3 Drawing Sheets

MECHANISM THAT HOLDS A HAULED OBJECT IN A PARTICULAR POSITION IN A PICKUP TRUCK BED

BACKGROUND

This disclosure relates to mechanisms used for hauling objects in the bed of a pickup truck, and, more particularly, to such mechanisms that hold the hauled object in a particular position in the pickup truck bed.

Owners of pickup trucks haul various items in the back bed of the truck. These items include trees, long boards, and so on. When these items are longer than the longitudinal length of the bed, a portion of the item is placed on the top of the bed rear tailgate. If one also wants to place items in the truck bed near the tailgate, the tailgate can be opened, but the longer items must be held up in the air while the tailgate is being opened. Or in the alternative, the area near the tailgate must be reached by attempting to go over the side of the truck bed. This is awkward, at best. In most instances, the area of the bed near the tailgate is not used because of this difficulty.

This disclosure provides a bar assembly adapted to be removable attached to the top of the sides of a bed of a pickup truck. The bar assembly can receive on top thereof the longer items. Since the bar assembly receives these items, the longer items no longer need to be placed on top of the rear tailgate, so the tailgate can now be used without a concern for the longer items present in the truck bed.

SUMMARY

Disclosed is a bar assembly adapted to be removable attached to the top of the sides of a bed of a pickup truck, the bar assembly including a bar, and attachment means adapted to engage each end of the bar for removably attaching each end of the bar to a respective top of the side of the bed of the pickup truck. An embodiment (not shown) would include the bar assembly being fixed under the bed sides to accommodate those beds that have some form of cover that has an assembly portion on top of the bed sides.

Figure 1:
FIG. 1 is a rear perspective view of the end of a pickup truck bed. Extending across the top of the bed is a bar assembly according to this disclosure.
Figure 2:
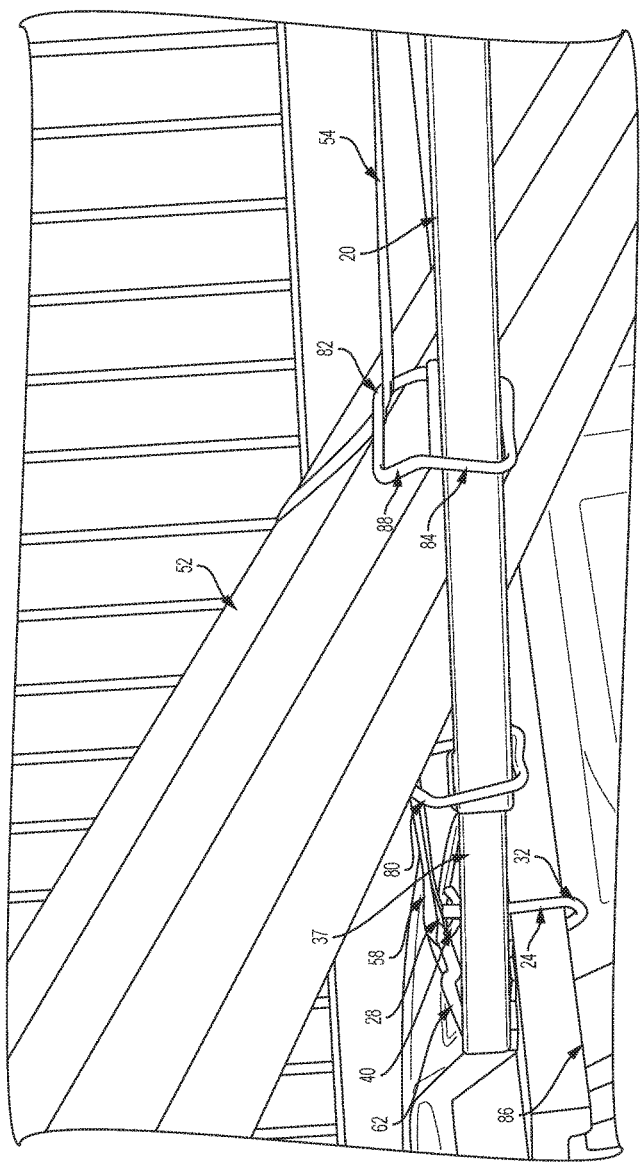
FIG. 2 is a perspective view of an end of the bar assembly shown in FIG.
Figure 3:
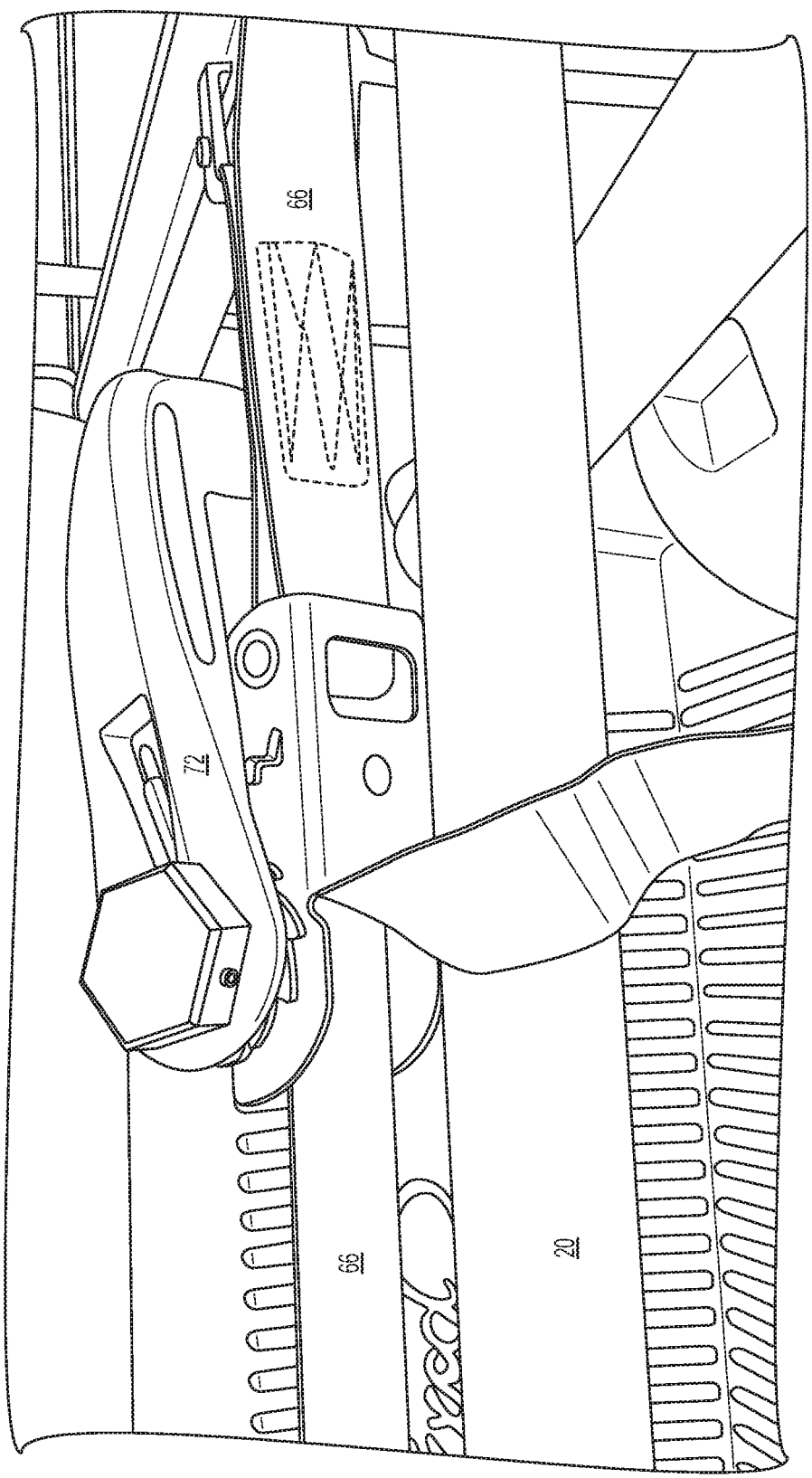
FIG. 3 is a side perspective view of another portion of the bar assembly shown in FIG. 1.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DESCRIPTION OF AN EMBODIMENT

As illustrated in the drawings, disclosed is a bar assembly 10 adapted to be removable attached to the top 14 of the sides 18 (only one is shown) of a bed of a pickup truck.

The bar assembly 10 includes a bar 20, and attaching means 24 adapted to engage each end 28 (only one is shown) of the bar 20 for removably attaching each end of the bar to a respective top 14 of the side 18 of the bed of the pickup truck. In the illustrated embodiment, the attaching means is the form of a J hook 24 including a threaded leg first end 28 passing through an opening (not shown) in each respective end of the bar. The leg 28 extends perpendicularly to the end of the bar.

The J hook 24 further includes a hook portion second end 32 adapted to engage and hold a lip 36 on a truck bed downwardly depending from the truck bed side top edge 14. A wing nut 40 is adapted to be threaded onto the hook leg 28, so that, when the wing nut 40 is threaded onto the leg threaded end, the wing nut 40 draws together the bar 20 and the truck bed side top edge 14 with the hook portion 32, trapping the bar 20 between the truck bed side top edge 14 and the hook portion 32.

The bar 20 is a hollow tube, and the bar length is extendable via a bar extension 37 that slides into the interior of the bar 20. The hollow tube 20 is larger than the bar extensions 37, so that the bar extensions 37 can slide within the hollow tube 20.

The bar assembly 10 further includes holding means for holding a board 52 or other item to be held within the truck. The holding means is in the form of a strap assembly 54 having two ends 58 (only one is shown), each end being releasably attached to the ends of the bar by strap hooks 62.

The strap assembly 54 includes two strap pieces 66, and a ratchet 72 connected between the pieces for shortening and lengthening the length of the strap assembly 54. Two sliding locks 80 and 82 are adapted to be placed over the bar 20 and are adapted to have a portion of the strap pass through each lock 80.

Each sliding lock includes a first loop 84 that is adapted to receive the bar 20, and a second loop 88 that is adapted to receive the piece 66 of the strap. The second loop 88 is angled relative to the first loop 84, thereby forming an acute angle between the loops.

In order to lock a board 52 on the bar assembly 10, a locking method comprises having the first lock 80 placed on one side of the board 52 so that the first sliding lock acute angle is facing the board 52, and having the second lock 82 placed on the other side of the board 52 so that the second sliding lock acute angle is facing the board 52. The locks are then slid to adjacent each side of the board. Because of the upward pull of the board on the straps, and the straps on the locks, the lock binds against the bar assembly bar, holding the locks in place. This, in turn, holds the board 52 in place on the bar 20. In other embodiments (not shown), the sliding locks can be slid onto the bar 20 with the acute angle of each lock facing away from the board 52, and the strap hooks 62 can be attached directed to the second loops 88.

Various other features of this disclosure are set forth in the following claims.

The invention claimed is:

1. A bar assembly adapted to be removable attached to the top of the sides of a bed of a pickup truck, the bar assembly including a bar, and attaching means adapted to engage each end of the bar for removably attaching each end of the bar to a respective top of the side of the bed of the pickup truck, the bar assembly also including holding means adapted to hold a board, the holding means comprising a strap assembly having two ends, each end being attached to the ends of the bar, the strap assembly including a strap, and two sliding locks adapted to be placed over the bar and adapted to have a portion of the strap pass through each lock.

2. A bar assembly according to claim 1 wherein each sliding lock includes a first loop that is adapted to receive the bar, and a second loop that is adapted to receive the portion of the strap.

3. A bar assembly according to claim 2 wherein the second loop is angled relative to the first loop thereby forming an acute angle between the loops.

4. A method of locking a board on a bar assembly adapted to be removable attached to the top of the sides of a bed of a pickup truck, the bar assembly including a bar, and attaching means adapted to engage each end of the bar for removably attaching each end of the bar to a respective top of the side of the bed of the pickup truck, the bar assembly also including holding means adapted to hold a board, the holding means comprising a strap assembly having two ends, each end being attached to the ends of the bar, the strap assembly including a strap, and two sliding locks adapted to be placed over the bar and adapted to have a portion of the strap pass through each lock, each sliding lock including a first loop that is adapted to receive the bar, and a second loop that is adapted to receive the portion of the strap, the second loop being angled relative to the first loop thereby forming an acute angle between the loops, the method comprising: placing the first lock on one side of the board so that the first sliding lock acute angle is facing the board, and placing the second lock on the other side of the board so that the second sliding lock acute angle is facing the board.

\* \* \* \* \*